US012801282B2

(12) United States Patent
Aga et al.

(10) Patent No.: US 12,801,282 B2
(45) Date of Patent: Nov. 17, 2026

(54) EFFICIENT REDUCE-SCATTER VIA NEAR-MEMORY COMPUTATION

(71) Applicant: ADVANCED MICRO DEVICES, INC., Santa Clara, CA (US)

(72) Inventors: Shaizeen Aga, Santa Clara, CA (US); Johnathan Alsop, Bellevue, WA (US); Nuwan Jayasena, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 153 days.

(21) Appl. No.: 17/990,092

(22) Filed: Nov. 18, 2022

(65) Prior Publication Data

US 2024/0168639 A1 May 23, 2024

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ..... G06F 3/0613; G06F 3/0659; G06F 3/0673
See application file for complete search history.

(56) References Cited

PUBLICATIONS

Hall et al., Mapping Irregular Applications to DIVA, a PIM-based Data-Intensive Architecture, ACM, 18 pages (Year: 1999).*
Fang et al., NetDAM: Network Direct Attached Memory with Programmable In-Memory Computing ISA, Oct. 2021, Association for Computing Machinery, 5 pages (Year: 2021).*
Graham et al., Scalable Hierarchical Aggregation Protocol (SHArP): A Hardware Architecture for Efficient Data Reduction, 2016 First International Workshop on Communication Optimizations in HPC (COMHPC), IEEE, DOI:10.1109/COM-HPC.2016.6, Date Added to IEEE Xplore: Jan. 26m, 2017, XX pages.
Rajbhandari et al., ZeRO: Memory Optimizations Toward Training Trillion Parameter Models, URL: arXiv:1910.02054, Submitted: Oct. 4, 2019, Last Revised: May 13, 2020, 24 pages.

* cited by examiner

*Primary Examiner* — Gary W. Cygiel

(57) ABSTRACT

An apparatus for performing distributed reduction operations using near-memory computation includes memory and a first near-memory compute node. The first-near-memory compute node is coupled to a plurality of near-memory compute nodes. The first near-memory compute node comprises logic to store first data loaded from a second near-memory compute node, perform a reduction operation on the first data and second data to compute a result; and store the result within the first near-memory compute node. In some aspects, the near-memory compute node includes a PIM execution unit and carries out the reduction operation utilizing PIM commands.

19 Claims, 8 Drawing Sheets

EFFICIENT REDUCE-SCATTER VIA NEAR-MEMORY COMPUTATION

BACKGROUND

Artificial neural networks (also referred to as neural network or neural nets) are networks comprised of interconnected nodes that are used to process complex input data to perform computing tasks such as image/pattern recognition, email spam filtering, and other artificial intelligence functions. Such computing tasks may be distributed among nodes in a distributed neural network which may be implemented with a variety of components such as processors, graphics processing units (GPUs), coprocessors, Field Programmable Gate Arrays (FPGAs), and the like. Neural networks are trained by processing examples, each of which contains a known input and result, forming probability-weighted associations between the input and result, which are stored within a data structure of the neural network. Neural network training for distributed systems is typically a time-consuming and computation-intensive activity. As such, additional processing capabilities, performance throughput, and reduction in burden on the main processors, GPUs, FPGAs, and the like of neural network nodes would be beneficial in systems that carry out such training.

BRIEF DESCRIPTION OF THE DRAWINGS

FIG. 4 illustrates another implementation of a reduce-scatter primitive in a system without PIM-enabled memory.

DETAILED DESCRIPTION

Figure 1:
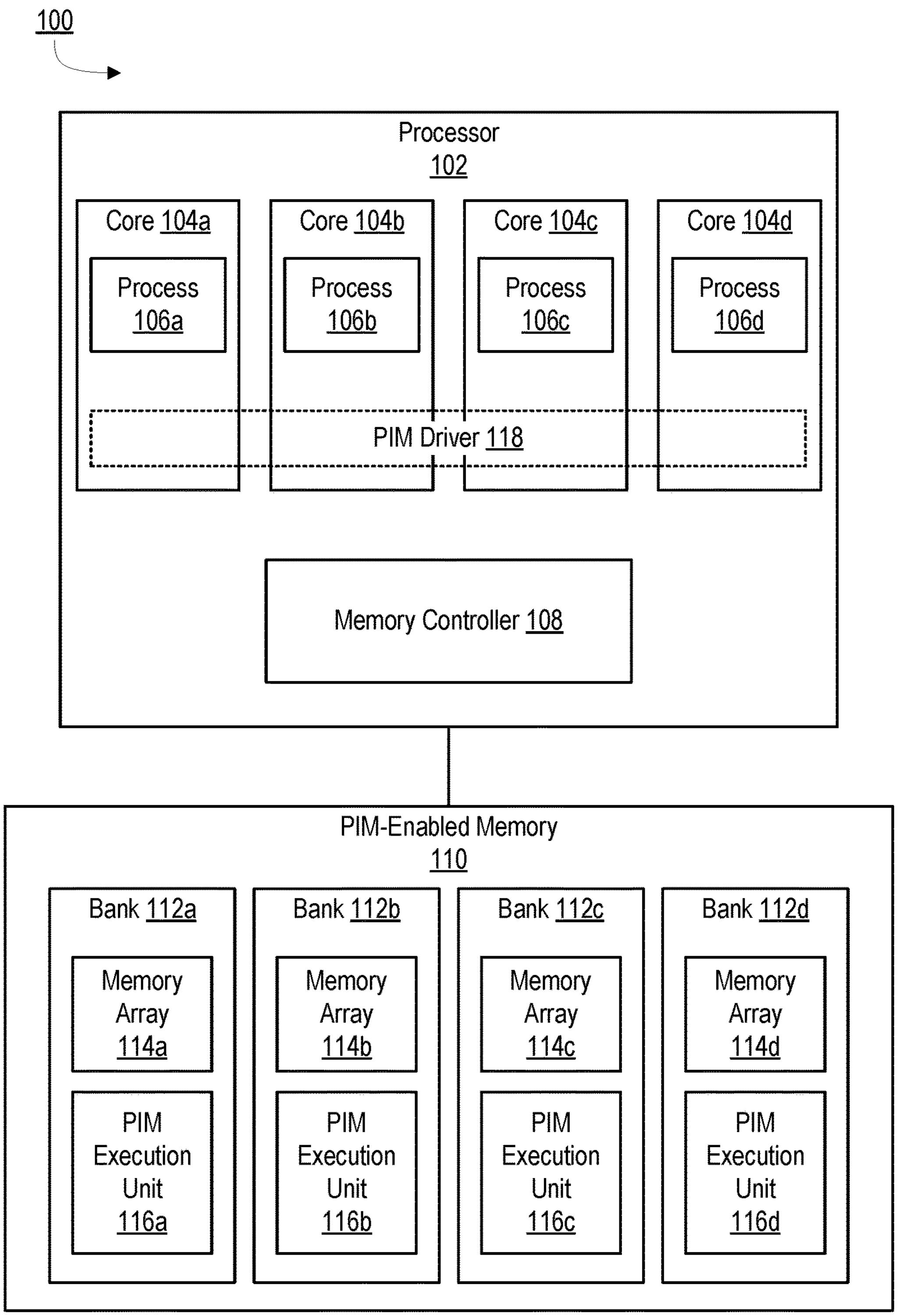
FIG. 1 sets forth a block diagram of an example near-memory compute node that includes PIM-enabled memory according to aspects described herein.

As mentioned above, additional processing capabilities, improved performance throughput, and reduction in computational burden on the main processors, GPUs, FPGAs, and the like of neural network nodes (referred to as 'compute nodes') provides benefits in training such a neural network. Further, large scale distributed neural network training often relies on distributed training to be performed in a memory-efficient manner. Memory-efficient distributed training has become increasingly important as machine learning model sizes continue to grow. Such situations necessitate partitioning parameters and tasks across compute nodes which, along with techniques such as data-parallel training, require 'reduction' operations (such as an all-reduce operation) across the compute nodes of these structures in each training iteration.

An all-reduce operation is an operation that reduces a set of arrays in a plurality of processes to a single array and returns the resultant array to all processes. An all-reduce operation often consists of a reduce-scatter operation followed by an all-gather operation. All-reduce operations exhibit high demand for interconnect bandwidth and memory bandwidth, as well as some demand for computing resources. All-reduce operations are commonly executed in parallel with data-parallel general matrix multiply (GEMM) operations in the backward pass of distributed neural networks which compete with reduce-scatter operations for memory and computation resources.

Implementations in accordance with the present disclosure provide for mechanisms and primitives that harness near-memory computation to enable processing units (e. g., CPU, GPU, etc.) to perform all-reduce primitives efficiently. Accordingly, implementations in accordance with the present disclosure provide for offloading of distributed reduction operations, such as a reduce-scatter operation, to in or near-memory compute nodes such as PIM (Processing-in-Memory) enabled memory. This, in turn, reduces memory bandwidth demand for the kernel of the compute node, and minimizes the interference impact that reduce-scatter may have on concurrently executing kernels such as GEMM.

PIM refers to an integration of compute and memory for execution of instructions that would otherwise be executed by a computer system's primary processor or processor cores. PIM-enabled memory often incorporate both memory and functional units in a single component or chip. Although PIM is often implemented as processing that is incorporated 'in' memory, this specification does not limit PIM only to those implementations. Instead, PIM may also include so-called processing-near-memory implementations and other accelerator architectures. That is, the term 'PIM' as used in this specification refers to any integration—whether in a single chip or separate chips—of compute and memory for execution of instructions that would otherwise be executed by a computer system's primary processor or processor core. In this way, PIM instructions are executed 'closer' to the memory accessed in carrying out the instruction. In this specification, the term "near-memory compute node" is used to refer to a system that includes PIM-enabled memory and is configured to perform distributed reduction operations according to various aspects of the present disclosure.

In some aspects, the techniques described herein relate to a system for performing distributed reduction operations using near-memory computation. The system includes a first near-memory compute node and a second near-memory compute node coupled to the first-near memory compute node. In some aspects, the first and second near-memory compute nodes are coupled to a plurality of other near-memory compute nodes in at least one of a ring topology or a tree topology.

The first near-memory compute node includes a processor, memory, and a PIM execution unit. The PIM execution unit includes logic to store first data loaded from the second near-memory compute node. In some aspects, the result is stored within the first near-memory compute node includes by executing a PIM store command within the first near-memory compute node. The PIM execution unit also includes logic to perform a reduction operation on the first data and second data to compute a result, with the second data being previously stored within the first near-memory compute node. The reduction operation, in some examples, forms part of an all-reduce operation. The PIM execution unit also includes logic to store the result within the first near-memory compute node.

In some aspects, the PIM execution also includes logic to receive one or more memory access requests, and trigger the operations of storing first data, performing the reduction operation, and storing the result based on the one or more memory access requests. In some implementations, the one or more memory access requests are received from the processor of the first near-memory compute node. In such an implementation, the processor of the first near-memory compute node is configured to send the one or more access requests to the second near-memory compute nodes. In other implementations, the one or more access requests are received from a second processor associated with the second near-memory compute node.

In some aspects, one or more of the memory access requests are addressed to a memory address, and the operations are triggered responsive to the memory address being within a memory address range. In some implementations, the operations are triggered responsive to one or more of the memory access requests including an indication of a memory request type.

In some implementations, performing the reduction operation on the first data and the second data includes performing an add, multiply, MIN, MAX, AND, OR, or XOR operation on the first data and the second data to compute the result.

Also described in this disclosure is an apparatus for performing a distributed reduction operations using near-memory computation. Such an apparatus includes memory and a first PIM execution unit. In some implementations, the PIM execution unit is coupled to a plurality of other PIM execution units in at least one of a ring topology or a tree topology. The PIM execution unit of the apparatus includes logic to execute a combined PIM load and PIM add command. The combined PIM load and PIM add command are executed to load first data from a second PIM execution unit, perform a reduction operation on the first data and second data to compute a first result, where the second data was previously stored within the first PIM execution unit, and store the first result within the memory of the first PIM execution unit. In some examples, the first data is used as a first operand and the second data is used as a second operand of the reduction operation.

In some implementations, the first PIM execution unit also includes logic to receive a memory access request and trigger execution of the combined PIM load and PIM add command. The memory access request, in some aspects, is addressed to a memory address, and the execution is triggered in response to the memory address being within a memory address range. The execution is triggered, in some implementations, in response to the memory access request including an indication of a memory request type.

Some techniques described herein relate to a method for performing distributed reduction operations using near-memory computation. Such a method includes receiving, by a first near-memory compute node of a plurality of near-memory compute nodes, one or more memory access requests. The method also includes triggering, based upon the one or more memory access requests, operations. The operations include storing, by the first near-memory compute node, first data within the first near-memory compute node, the first data being loaded from a second near-memory compute node. The operations also include performing, by the first near-memory compute node, a reduction operation on the first data and second data previously stored within the first near-memory compute node to compute a result. The reduction operation forms part of an all-reduce operation. The operations triggered by the memory access requests also include storing, by the first near-memory compute node, the result within the first near-memory compute node. In some aspects, performing the reduction operation on the first data and the second data includes adding, multiplying, minimizing, maximizing, ANDing, ORing, or XORing the first data and the second data to compute the first result.

As mentioned above, various systems for performing efficient reduction operations disclosed herein include a near-memory compute node. For further explanation, FIG. 1 sets forth a block diagram of an example near-memory compute node that includes PIM-enabled memory according to aspects described herein. The example near-memory compute node 100 of FIG. 1 depicts a processor 102 coupled to PIM-enabled memory 110. The processor 102 includes one or more processor cores 104*a*, 104*b*, 104*c*, 104*d* and a memory controller 108. The memory controller 108 supports accessing the PIM-enabled memory 110.

The processor 102 of FIG. 1 is configured for multi-process execution. For example, each core 104*a*, 104*b*, 104*c*, 104*d* of the processor 102 executes a different process 106*a*, 106*b*, 106*c*, 106*d* of the same or a different application. As illustrated, processor core 104*a* executes process 106*a*, processor core 104*b* executes process 106*b*, processor core 104*c* executes process 106*c*, and processor core 104*d* executes process 106*d*. In various examples, the processor cores are CPU cores, GPU cores, or APU cores.

A GPU is a graphics and video rendering processing device for computers, workstations, game consoles, and the like. A GPU can be implemented as a co-processor component to the CPU of a computer. The GPU can be discrete or integrated. For example, the GPU can be provided in the form of an add-in card (e.g., video card), stand-alone co-processor, or as functionality that is integrated directly into the motherboard of the computer or into other devices.

A GPU is a graphics and video rendering processing device for computers, workstations, game consoles, and the like. A GPU can be implemented as a co-processor component to the CPU of a computer. The GPU can be discrete or integrated. For example, the GPU can be provided in the form of an add-in card (e.g., video card), stand-alone co-processor, or as functionality that is integrated directly into the motherboard of the computer or into other devices.

The phrase accelerated processing unit (APU) is considered to be a broad expression. APU refers to any cooperating collection of hardware and/or software that performs those functions and computations associated with accelerating graphics processing tasks, data parallel tasks, nested data parallel tasks in an accelerated manner compared to conventional CPUs, conventional GPUs, software and/or combinations thereof. For example, an APU is a processing unit (e.g., processing chip/device) that can function both as a CPU and a GPU. An APU can be a chip that includes additional processing capabilities used to accelerate one or more types of computations outside of a general-purpose CPU. In one implementation, an APU can include a general-purpose CPU integrated on a same die with a GPU, a FPGA, machine learning processors, digital signal processors (DSPs), and audio/sound processors, or other processing unit, thus improving data transfer rates between these units while reducing power consumption. In some implementations, an APU can include video processing and other application-specific accelerators.

In an implementation, the processor cores 104*a*, 104*b*, 104*c*, 104*d* operate according to an extended instruction set architecture (ISA) that includes explicit support for PIM offload instructions that are offloaded to a PIM device for execution. Examples of PIM offload instruction include a PIM_Load and PIM_Store instruction among others. In another implementation, the processor cores operate according to an ISA that does not expressly include support for PIM offload instructions. In such an implementation, a PIM driver 118, hypervisor, or operating system provides an ability for a process to allocate a virtual memory address range that is utilized exclusively for PIM offload instructions. An instruction referencing a location within the aperture will be identified as a PIM offload instruction.

In the implementation in which the processor cores 104*a*, 104*b*, 104*c*, 104*d* operate according to an extended ISA that explicitly supports PIM offload instructions, a PIM offload instruction is completed by the processor cores when virtual and physical memory addresses associated with the PIM instruction are generated, operand values in processor registers become available, and memory consistency checks have completed. The operation (e.g., load, store, add, multiply) indicated in the PIM offload instruction is not executed on the processor core and is instead offloaded for execution on the PIM-enabled memory 110. Once the PIM offload instruction is complete in the processor core, the processor core issues a PIM command, operand values, memory addresses, and other metadata to the PIM-enabled memory 110. In this way, the workload on the processor cores 104*a*, 104*b*, 104*c*, 104*d* is alleviated by offloading an operation for execution to a PIM-enabled memory 110.

The PIM-enabled memory 110 of FIG. 1 includes a number of banks 112*a*, 112*b*, 112*c*, 112*d*. Each bank 112*a*, 112*b*, 112*c*, 112*d* includes a memory array 114*a*, 114*b*, 114*c*, 114*d* and a PIM execution unit 116*a*, 116*b*, 116*c*, 116*d*, respectively. Each PIM execution unit 116*a*, 116*b*, 116*c*, 116*d* can include various logic (not shown here) to carry out PIM operations. For example, a PIM execution unit can include logic for decoding instructions or commands issued from the processor cores 104*a*, 104*b*, 104*c*, 104*d*, a LIS (local instruction store) that stores a PIM instruction that is to be executed in the PIM-enabled memory, an ALU (arithmetic logic unit) that performs operations indicated in the PIM instructions, and a register file for temporarily storing data of load/store operations or intermediate values of ALU computations. In some examples, such an ALU is capable of performing a limited set of operations relative to ALUs (not shown) of a processor core 104*a*, 104*b*, 104*c*, 104*d*, thus making the ALU of the PIM execution unit less complex to implement and more suited for an in-memory implementation. A PIM instruction can move data between the registers of a PIM execution unit and memory of a memory array and a PIM instruction can trigger computation on this data in an ALU of the PIM execution unit.

The PIM-enabled memory of FIG. 1 is one example in which one or more PIM execution units are included as components of the memory. In some examples, a PIM execution unit can be implemented as a component that is separate from and coupled to memory. Such an implementation is often referred to as Processing-Near-Memory (PNM). The term PIM, herein, is used to refer to either implementation in which PIM execution units are components of memory and implementations in which PIM execution units are components separate from memory, but are coupled to memory. Aspects of scheduling PIM and non-PIM requests as disclosed herein can be applied to all such implementations.

In some examples, a PIM-enabled memory is included in a system along with the processor. For example, a system on chip may include a processor and the PIM enabled memory. As another example, a processor and PIM-enabled memory are included on the same PCB (Printed Circuit Board). In other aspects, a PIM-enabled memory can be a component that is remote with respect to the processor. For example, a system-on-chip, FPGA (Field Programmable Gate Array), or ASIC (Application Specific Integrated Circuit) may implement the processor which is separate from the PIM-enabled memory.

PIM-enabled memory may be implemented as DRAM. In some examples, the PIM-enabled memory is a double data rate (DDRx) memory, graphics DDRx (GDDRx) memory, low power DDRx (LPDDRx) memory, high bandwidth memory (HBM), hybrid memory cube (HMC), or other memory that supports PIM.

Figure 2:
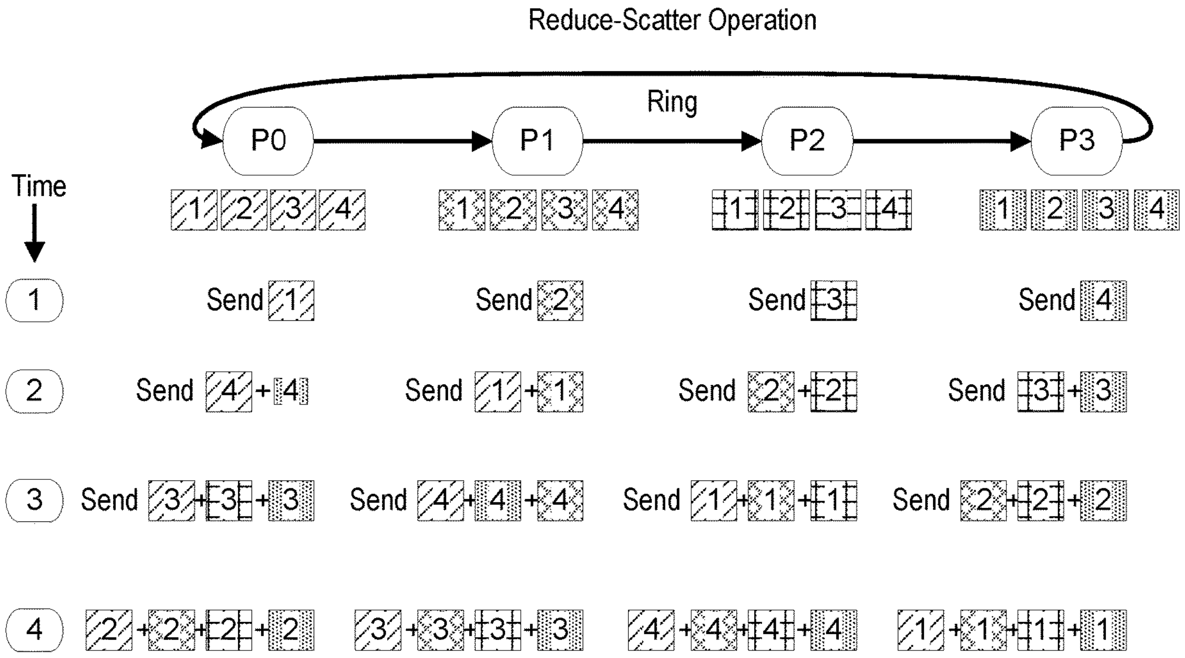
FIG. 2 illustrates an example ring-based reduce-scatter primitive operation.

FIG. 2 illustrates an example ring-based reduce-scatter primitive operation. The operation of FIG. 2 is described here as an example of a reduce-scatter operation, generally agnostic to the underlying systems and devices that carry out the operation. In FIG. 2, four nodes are utilized to carry out the reduce-scatter operation. Each of the nodes can be implemented as a system similar to that shown in FIG. 1.

In this example, an array with four elements is to be reduced across four nodes (P0, P1, P2, and P3). Each node (P0, P1, P2, and P3) has four elements which need to correspondingly be reduced. To realize this operation, the nodes communicate an element of data to a neighboring node and invoke a reduction kernel to reduce the received data element with a locally available data element. The received data element can be 'reduced' in a variety of manners according to a variety of different operations such as MAX, MIN, SUM, AND, OR, XOR, and similar operations. In the example of a FIG. 2, at a first time, node P0 receives an element of data from node P3 and sends an element of data to node P1. Similarly at the first time, node P1 receives the element of data from node P0 and sends an element of data to node P2; node P2 receives the element of data from node P1 and sends an element of data to node P3; and node P3 receives the element of data from node P2 and sends the element of data to node P0. Each of the nodes (P0, P1, P2, and P3) performs a reduction operation on the received element of data and a locally stored element of data to compute a result. The process continues until the distributed reduction operations are complete. Overall, for four elements over four nodes, each node sends three data elements, performs three local reductions and receives three data elements. After completion of the reduce-scatter primitive, the nodes (P0, P1, P2, and P3) perform an all-gather primitive to share reduced data elements between nodes (not depicted).

Figure 3:
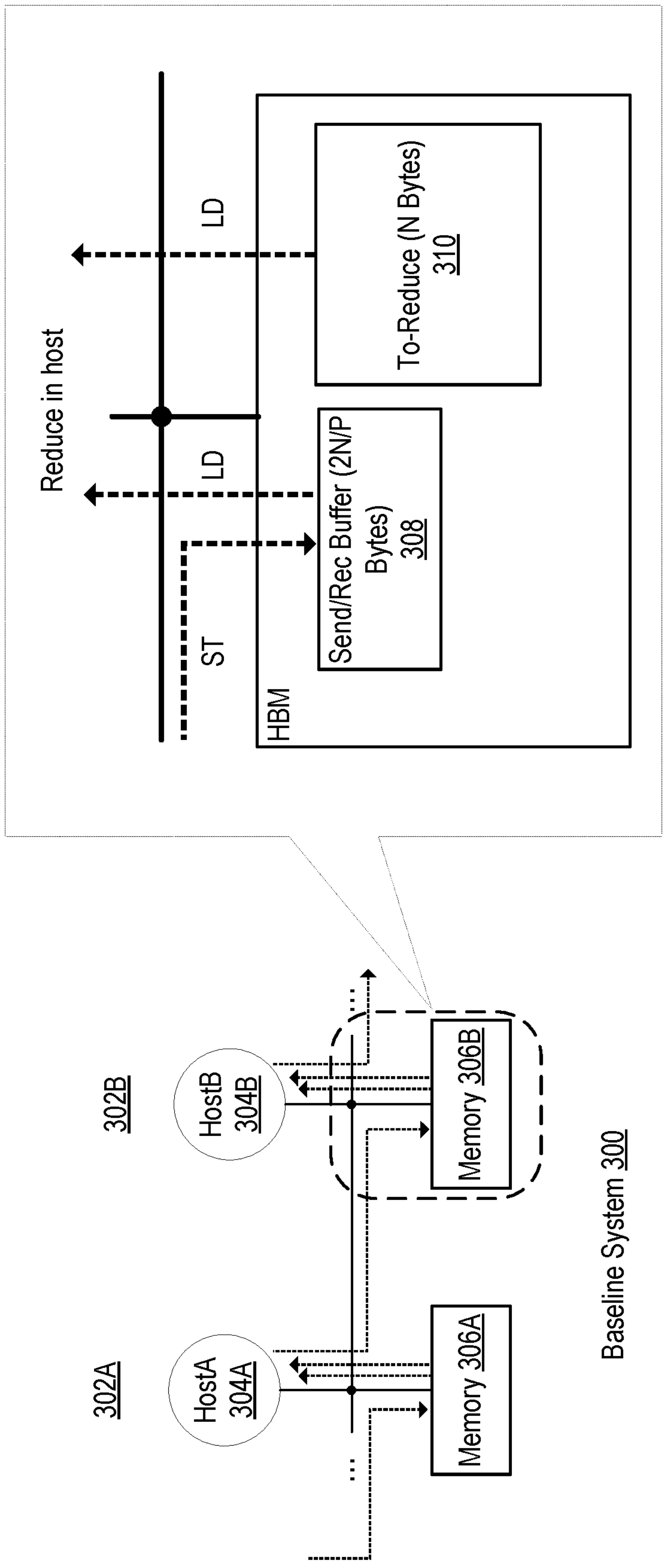
FIG. 3 illustrates an implementation of a reduce-scatter primitive in a conventional baseline system 300 without PIM-enabled memory.

FIG. 3 illustrates an implementation of a reduce-scatter primitive in a conventional baseline system 300 without PIM-enabled memory. The baseline system 300 includes a first compute node 302A and a second compute node 302B configured as nodes of a ring-based reduce-scatter implementation for performing distributed reduction operations. The first compute node 302A includes a first host processor (Host A) 304A coupled to a first memory device 306A. The second compute node 302B includes a second host processor (Host B) 304B coupled to a second memory device 306B. In a particular implementation, the first memory device 306A and the second memory device 306B each include a send/receive buffer 308 for storing data received and sent to a host processor and a to-reduce buffer 310 including data to be reduced by a host processor during a distributed reduction operation. In a particular implementation, the first memory device 306A and the second memory device 306B are high bandwidth memory (HMB) devices. A key operation in the reduce-scatter primitive is that a node (e.g., first compute node 302A) has a local element (e.g., array a[ ]) which is to be added to an element (e.g., array b[ ]) at another node (e.g., second compute node 302B). For each element in array a[ ], the first compute node 302A stores a value into the dedicated communication buffer (e.g., to-reduce buffer 310) in the local memory of the second memory device 306B of the second compute node 302B. Then, second compute node 302B loads the data stored in array a[ ] by first compute node 302A, adds the elements in array a[ ] to the corresponding elements in array b[ ] stored in the second memory device 306B of second compute node 302B, and stores the result to a dedicated buffer in the memory of the subsequent neighboring compute node in the ring. In the implementation of FIG. 3, the reduce operations are performed by the host processor.

This implementation accesses three bytes of data from every byte transferred between devices. This implementation requires the ability to easily synchronize with adjacent nodes and the ability to write directly to the memory of adjacent nodes in the reduce-scatter ring. It is therefore most likely to be used between devices that sit on the same node and are connected by a high-throughput low-latency coherent interconnect.

Figure 4:
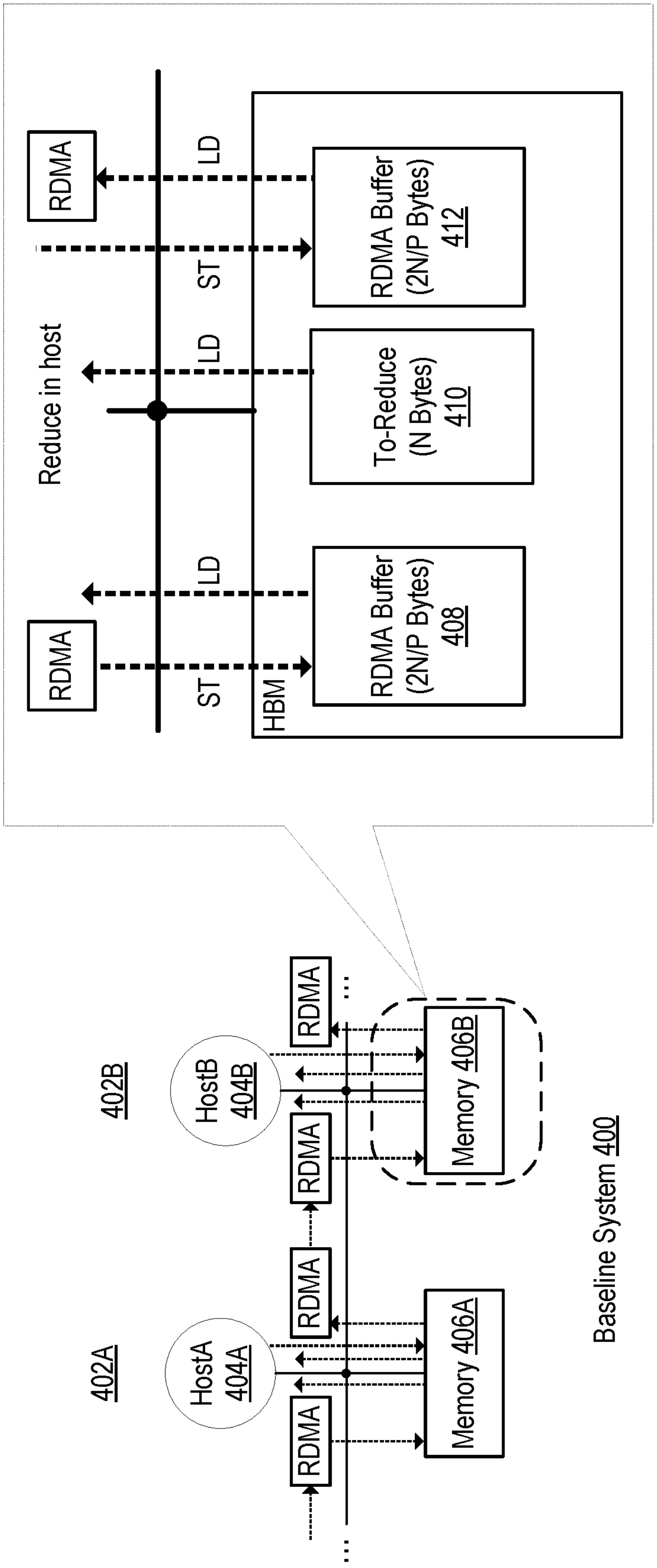
FIG. 4 illustrates another implementation of a reduce-scatter primitive in a conventional baseline system 400 without PIM-enabled memory.

FIG. 4 illustrates another implementation of a reduce-scatter primitive in a conventional baseline system 400 without PIM-enabled memory. The baseline system 400 includes a first compute node 402A and a second compute node 402B configured as nodes of a ring-based reduce-scatter implementation for performing distributed reduction operations. The first compute node 402A includes a first host processor (Host A) 404A coupled to a first memory device 406A. The second compute node 402B includes a second host processor (Host B) 404B coupled to a second memory device 406B. The implementation of FIG. 4 is similar to that of FIG. 3 except that this implementation does not assume that compute nodes can directly access each other's memory. Instead, the first compute node 402A communicates with the second compute node 402B through dedicated data transfer agents such as a remote direct memory access (RDMA) agent labeled as RDMA in FIG. 4 to implement data transfer between device memories. The RDMA agent avoids the need for a single coherent memory space. In a particular implementation, the first memory device 406A and the second memory device 406B each include a first RDMA buffer 408, a to-reduce buffer 410, and a second RDMA buffer 412. In a particular implementation, the first memory device 406A and the second memory device 406B are high bandwidth memory (HBM) devices.

After the RDMA agent of the second compute node 402B has written some transferred data into a dedicated buffer, the second compute node 402B loads that data, reduces it with the corresponding data in array b[ ], and stores the result to an outgoing transfer buffer. This implementation is a better fit for systems in which implicit memory coherence is not feasible, for example, devices on separate nodes in a distributed system, where RDMA agents handle explicit data transfer between devices (e.g., via an MPI protocol). Although these reduce-scatter operations may be bottlenecked by interconnect bandwidth on some systems when run in isolation, they still consume memory bandwidth (three bytes accessed per byte transferred for the former implementation, five bytes accessed per byte transferred for the latter implementation) and compute resources (one reduction operation per element for both elements), which can interfere with kernels that may run concurrently on the host (e.g., GEMM for a distributed neural network backward pass). In the implementation of FIG. 4, the reduce operations are performed by the host processor.

In various implementations described by the present disclosure, in/near memory computation is harnessed to efficiently perform distributed reduction operations, with minimal host involvement and with reduced effective memory bandwidth demand. Accordingly, data movement overhead is reduced and performance for co-scheduled kernels is improved since there is less competition for memory and compute resources.

Figure 5:
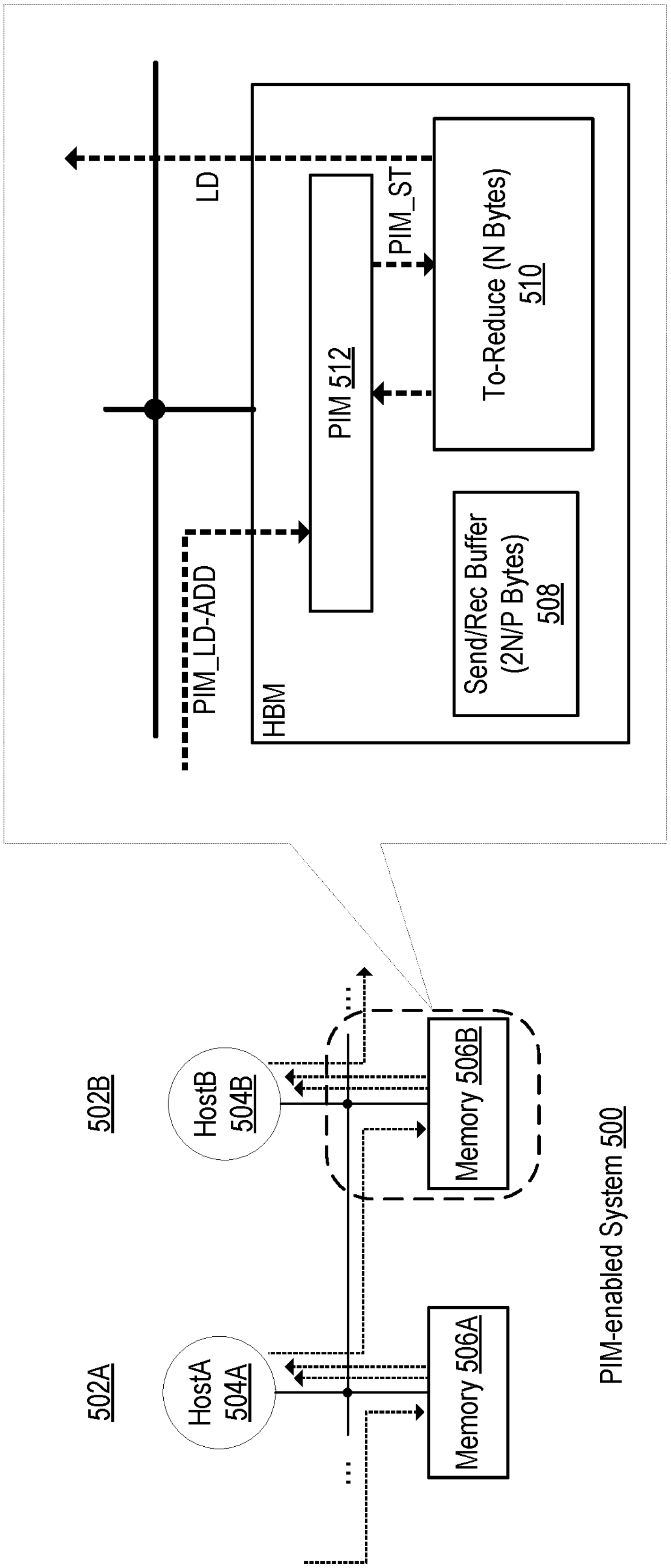
FIG. 5 illustrates an implementation of a system 500 for offloading of distributed reduction operations to near-memory computation units in accordance with the present disclosure.

FIG. 5 illustrates an implementation of a system 500 for offloading of distributed reduction operations to near-memory computation units in accordance with the present disclosure. In a particular implementation, the near-memory computation units include PIM devices. The baseline system 500 of FIG. 5 includes a first compute node 502A and a second compute node 502B configured as nodes of a ring-based reduce-scatter implementation for performing distributed reduction operations. The first compute node 502A includes a first host processor (Host A) 504A coupled to a first memory device 506A. The second compute node 502B includes a second host processor (Host B) 504B coupled to a second memory device 506B. In a particular implementation, the first memory device 506A and the second memory device 506B each include a send/receive buffer 508, a to-reduce buffer 510, and PIM logic 512 for performing distributed reduction operations as described herein. In a particular implementation, the first memory device 506A and the second memory device 506B are PIM-enabled high bandwidth memory (HBM) devices.

Figure 6:
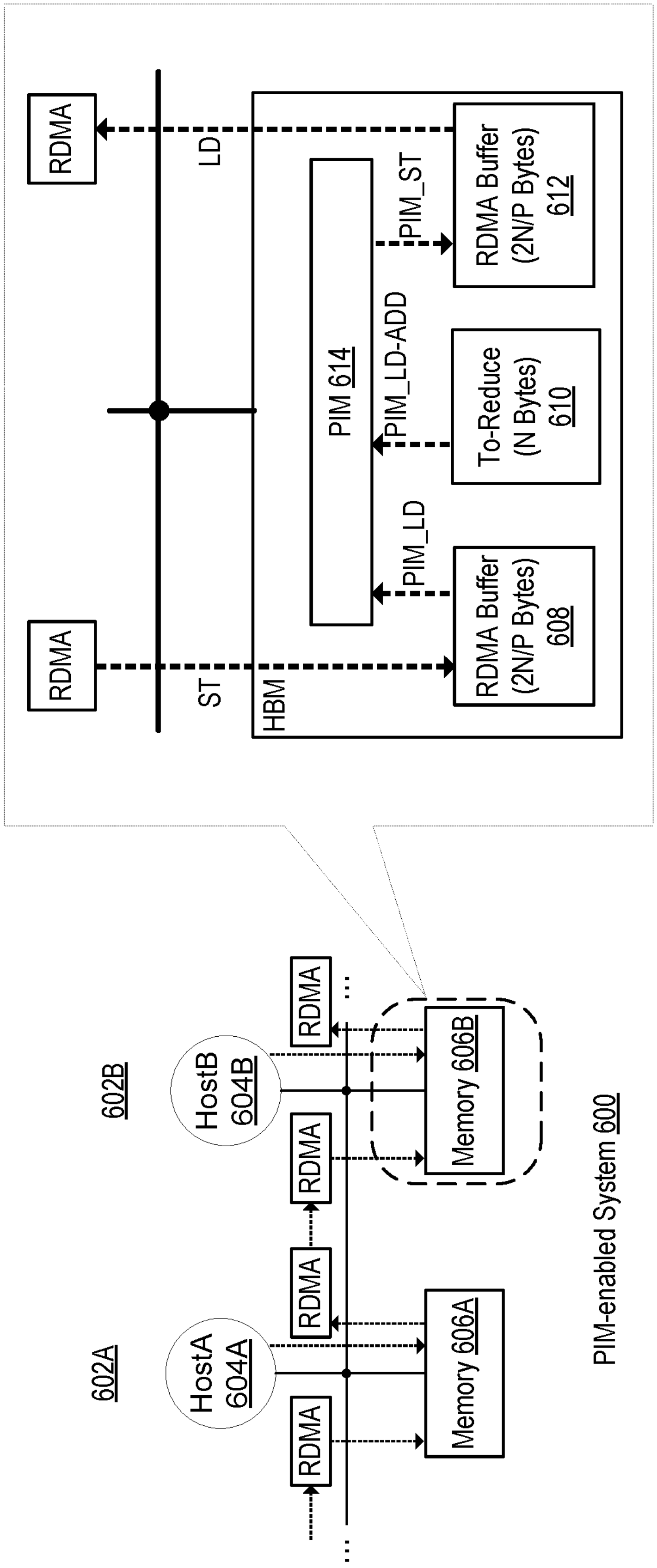
FIG. 6 illustrates another implementation of a system 600 for offloading of distributed reduction operations to near-memory computation units in accordance with the present disclosure.

FIG. 6 illustrates another implementation of a system 600 for offloading of distributed reduction operations to near-memory computation units in accordance with the present disclosure. The baseline system 600 includes a first compute node 602A and a second compute node 602B configured as nodes of a ring-based reduce-scatter implementation for performing distributed reduction operations. The first compute node 602A includes a first host processor (Host A) 604A coupled to a first memory device 606A. The second compute node 602B includes a second host processor (Host B) 604B coupled to a second memory device 606B. The implementation of FIG. 6 is similar to that of FIG. 5 except that this implementation does not require neighboring compute nodes to be able to directly access each other's memory. Instead, the first compute node 602A communicates with the second compute node 602B through dedicated data transfer agents such as a remote direct memory access (RDMA) agent labeled as RDMA in FIG. 6 to implement data transfer between device memories. In a particular implementation, the first memory device 606A and the second memory device 606B each include a first RDMA buffer 608, a to-reduce buffer 610, a second RDMA buffer 612, and PIM logic 614 for performing distributed reduction operations as described herein. In a particular implementation, the first memory device 606A and the second memory device 606B are PIM-enabled high bandwidth memory (HBM) devices.

As discussed above, a reduction operation of a collection of data elements is comprised of multiple invocations of a single operation, namely communicating data between two nodes and using the communicated data to perform a reduction with data at a destination node. One or more implementations described herein provide for performing this reduction in near-memory in the example systems of FIG. 5 and FIG. 6.

Referring to FIGS. 5-6, a first compute node (502A, 602A) is shown with an element (a[ ]) in local memory which is to be added to an element (b[ ]) in memory of the second compute node (502B, 602B). In the implementation of FIG. 5, one of the three total memory accesses (33%) are accelerated with PIM by having the first compute node 502A initiate a combined LD+Add using near memory compute logic. In the example implementation, an Add operation is shown, although any operation can be used in other implementations. The first compute node 502A stores the result which is already near memory using an accelerated PIM_ST command before allowing the second compute node 502B to load the result and perform the same operation with a subsequent neighbor. In the implementation of FIG. 6, three of the five total memory accesses (60%) are accelerated with PIM by replacing all non-RDMA memory accesses with PIM-accelerated near-memory reduction operations. In all cases, these accelerated PIM operations reduce the memory bandwidth needed for the reduction operation because they avoid moving data across the memory interface.

In various implementations, these methods may be applied to arbitrary reduction topologies (e.g., ring, tree, or other topologies), arbitrary compute platforms (e.g., CPU, GPU, ASIC, or a compute-enabled routing unit), and systems with coherent or non-coherent memory spaces. The only requirement is that communication between units that perform the reduction operation occurs through memory at each unit that is equipped with near-memory logic that is capable of performing the reduction operation efficiently, as described above.

In one or more implementations, in order to implement the above near-memory reduction optimizations, the manner in which the near-memory operations represented by the PIM_LD, PIM_LD-Add, and PIM_ST arrows that do not extend outside of the memory block are triggered are defined. In one implementation, software defines a memory address range ahead of time that will be treated differently by memory controller logic. For example, stores to this memory address range may be treated as atomics, triggering a near memory load, reduce operation, and store within near-memory without further intervention from the host processor. In another implementation, a separate memory request type is defined for the atomic similar to a read/modify/write (RMW), or for each element of the atomic (PIM_LD, PIM_LD+Add, PIM_ST as needed) which may be explicitly issued by software, or which may be used to replace a standard memory request based on information present at the host. For example, added information in a page table entry may determine that a store should be replaced by an atomic. In all cases, these special requests can bypass the cache hierarchy at the host to avoid cache pollution since the reduce-scatter workload exhibits no data reuse.

In one or more variations, the command for performing a reduction operation may be initiated by the same host that initiated the original memory request being replaced (e.g., the first compute node 502A in FIG. 5 or the second compute node 602B in FIG. 6). In the implementation of FIG. 5, the command may alternatively be initiated by the local device (e.g., the first compute node 502A) on behalf of another host (e.g., the second compute node 502B). The first compute node 502A may issue these commands from software (e.g., after the second compute node 502B has synchronized via a shared variable, or triggered an interrupt at the second compute node 502B). Alternately, the first compute node 502A may include dedicated hardware that is able to process messages from the second compute node 502B and issue a predetermined sequence of commands when requested by the second compute node 502B. The request from the second compute node 502B may take the form of a memory access to a specific address or range of addresses that may be mapped to a control register in the first compute node 502A, or the second compute node 502B may send a message that uses a command communication network that is separate from the memory data fabric.

Since initiating a near-memory compute operation necessarily involves communicating across the memory interface, the bandwidth used by this initiation should be smaller than the bandwidth used by the baseline memory access in order to reduce bandwidth demand. This can be ensured in multiple ways. For example, near-memory operations can be used to reduce command bandwidth, and address information from a first PIM request can be saved to help calculate addresses for additional command(s) that are automatically generated by the first request. A key point is, if a combined atomic command is used as described above in which a single command that signifies PIM_LD-Add plus PIM_ST or PIM_LD plus PIM_LD-Add plus PIM_ST, bandwidth needed is already reduced since only a single command is issued rather than multiple commands. Alternatively, near-memory compute commands may be defined to apply to multiple addresses based off of a base address (e.g., all addresses in a pre-defined range, a fixed number of addresses or strided addresses following the address specified in the command, the same address offset within each memory bank, etc.). Current PIM designs take advantage of this latter form of command bandwidth reduction by issuing the same command to multiple banks sharing a channel command bus in parallel, although patterns may also be generated that are more complex or programmable than "the same offset in every bank." In these ways, a single near-memory compute command may be sent to multiple nodes to be used for multiple near memory reduce operations, thus saving memory command bandwidth.

Figure 7:
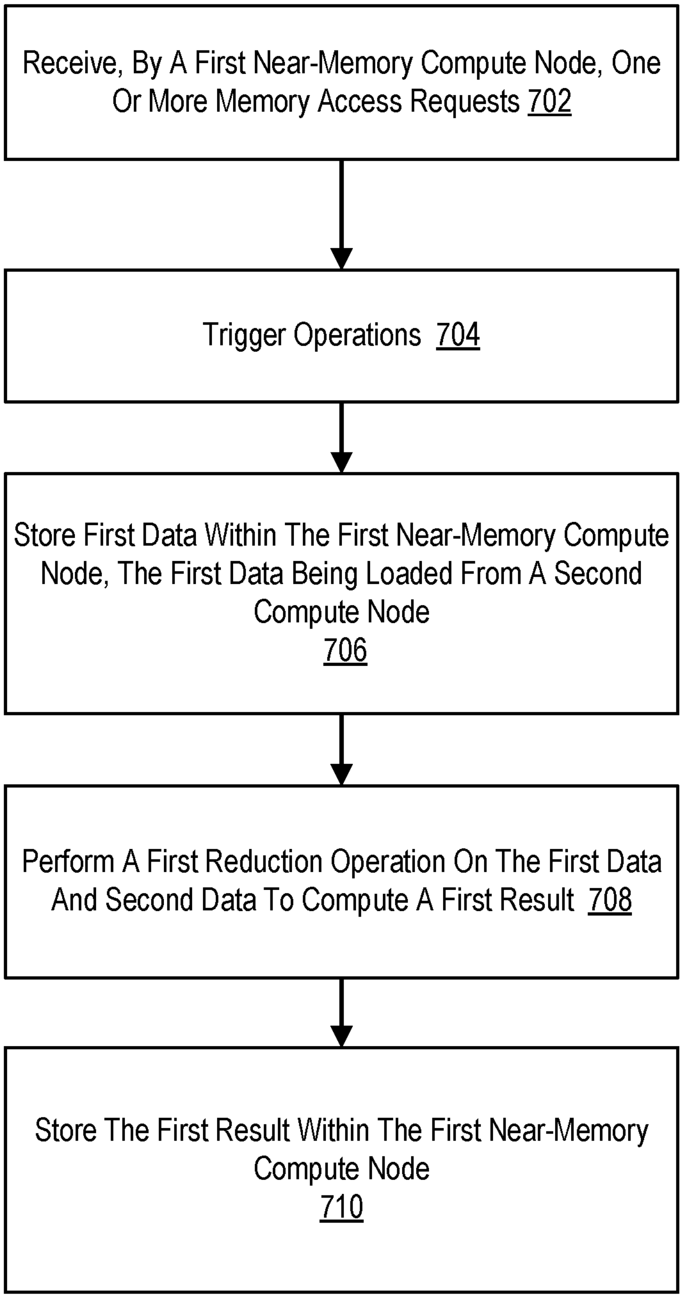
FIG. 7 sets forth a flow chart illustrating an example method for performing distributed reduction operations using near-memory computation according to some implementations of the present disclosure.

FIG. 7 sets forth a flow chart illustrating an example method for performing distributed reduction operations using near-memory computation according to some implementations of the present disclosure. The method of FIG. 7 represents the steps carried out by a single near-memory compute node for a single iteration of a distributed reduction operation. To carry out an entire distributed reduction over many different compute nodes in a neural network, the method of FIG. 7 can be performed, in parallel, by each of the compute nodes in the neural network. Additionally, each compute node will carry out the method of FIG. 7 for every element of the array that is being reduced or, said another way, for the number of compute nodes in the neural network. For example, in a neural network that includes ten compute nodes, each compute node will perform the method of FIG. 7, in parallel (or approximately in parallel), ten times.

The method of FIG. 7 includes receiving 702, by a first near-memory compute node of a plurality of near-memory compute nodes, one or more access requests. The one or more memory access requests are received from a first host processor associated with the first near-memory compute node. In another implementation, the one or more access requests are received from a second host processor associated with a second near-memory compute node of the plurality of near-memory compute nodes. In an implementation, the first host processor is configured to send the one or more access requests to each of the plurality of near-memory compute nodes. In an implementation, the plurality of near-memory compute nodes is connected in at least one of a ring topology or a tree topology.

The method of FIG. 7 further includes triggering 704 operations based on the one or more of the memory access requests. The operations triggered by the memory access requests include storing 706 first data within the first near-memory compute node. The first data is loaded from a second near-memory compute node of the plurality of near-memory compute nodes. In one or more implementations, each of the plurality of near-memory compute nodes comprises at least one PIM device and the first data is loaded from the second compute node to the first through a PIM operation.

The operations triggered by the memory access requests also include performing 708 a first reduction operation on the first data and second data previously stored within the first near-memory compute node to compute a first result. Such a reduction operation can include performing an add, multiply, MIN, MAX, AND, OR, or XOR operation on the first data and the second data to compute the first result. The operations triggered by the memory access requests also include storing 710 the first result within the first near-memory compute node. In aspects in which the first compute node includes a PIM device, the first compute node stores the first result through execution of a PIM store command.

In an implementation, one or more of the memory access requests are addressed to a first memory address, and the triggering 704 of the operations (706, 708, 710) is responsive to the first memory address being within a first memory address range. That is, the first comp0ute node determines what type of operations to perform based on the memory address of the memory access requests, Various memory address ranges can be predefined and associated with different operation types so that a memory access request addressing a first predefined range triggers a comp0ute first set of operations while a memory access request addressing a second predefined range triggers a second set of operations. In another implementation, the triggering 704 of the operations (706, 708, 710) is responsive to one or more of the memory access requests including an indication of a particular memory request type. Different types of memory access requests can be associated with different types of operations.

Figure 8:
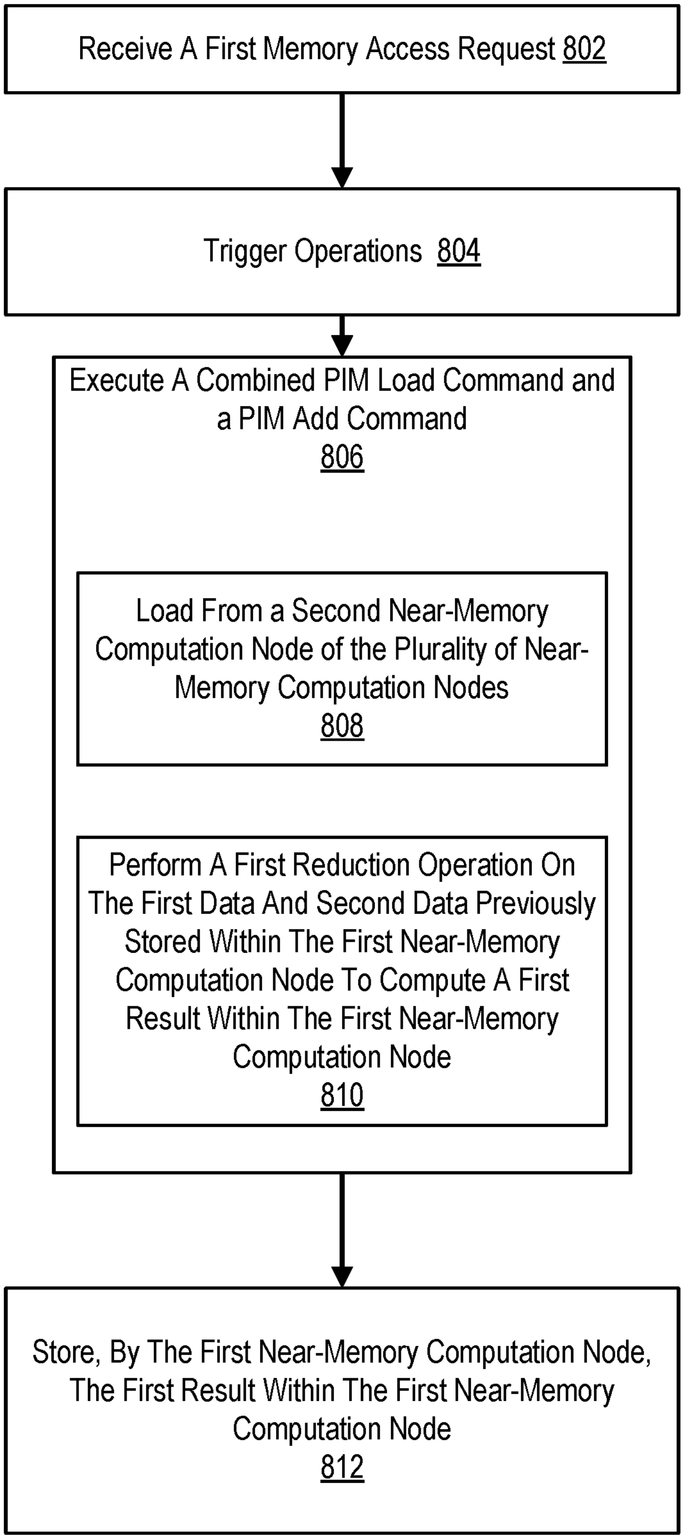
FIG. 8 sets forth a flow chart illustrating an example method for performing distributed reduction operations utilizing a combined PIM command to carry out the reduction operation according to some implementations of the present disclosure.

FIG. 8 sets forth a flow chart illustrating an example method for performing distributed reduction operations utilizing PIM devices and a combined PIM command to carry out the reduction operation. The method includes receiving 802, by a first near-memory compute node of a plurality of near-memory compute nodes, a first memory access request. Each of the plurality of near-memory compute nodes includes at least one PIM device.

The method of FIG. 8 also includes triggering 804 operations based on the first memory access request. In the example of FIG. 8, the operations triggered by the first memory access request include executing 806 a combined PIM load command and a PIM add command. The execution of the combined PIM load and PIM add commands loads 808 first data from a second near-memory compute node of the plurality of near-memory compute nodes The execution of the combined PIM load and PIM add commands also performs 810 a first reduction operation on the first data and second data previously stored within the first near-memory compute node which computes a first result within the first near-memory compute node.

The method further includes storing 812, by the first near-memory compute node, the first result within the first near-memory compute node. The storing of the first result can be carried out by a PIM store command, thus alleviating memory bandwidth and reducing processing requirements on primary processors of the compute node.

In an implementation, the first data is used as a first operand and the second data is used as a second operand of the first reduction operation. In an implementation, the first access request is addressed to a first memory address, and the triggering of the operations is responsive to the first memory address being within a first memory address range. In an implementation, the triggering of the operations is responsive to the first access request including an indication. In an implementation, the indication includes a memory request type of the first access request.

While various implementations have been described in the context of HBM and DRAMs, the principles described herein are applicable to any memory that can accommodate near-memory computing, which can encompass other forms of emerging as well as traditional forms of memory such as SRAM scratchpad memories and the like.

Implementations can be a system, an apparatus, a method, and/or logic. Computer readable program instructions in the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some implementations, electronic circuitry including, for example, programmable logic circuitry, field-programmable gate arrays (FPGA), or programmable logic arrays (PLA) can execute the computer readable program instructions by utilizing state information of the computer readable program instructions.

Aspects of the present disclosure are described herein with reference to flowchart illustrations and/or block diagrams of methods, apparatus (systems), and logic circuitry according to some implementations of the disclosure. It will be understood that each block of the flowchart illustrations and/or block diagrams, and combinations of blocks in the flowchart illustrations and/or block diagrams, can be implemented by logic circuitry.

The logic circuitry can be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and logic circuitry according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to implementations thereof, it will be understood that various changes in form and details can be made therein without departing from the spirit and scope of the following claims. Therefore, the implementations described herein should be considered in a descriptive sense only and not for purposes of limitation. The present disclosure is defined not by the detailed description but by the appended claims, and all differences within the scope will be construed as being included in the present disclosure.

What is claimed is:

1. A system for performing distributed reduction operations using near-memory computation, the system comprising:

a first near-memory compute node; and a second near-memory compute node coupled to the first near-memory compute node, wherein the first near-memory compute node comprises a processor, memory, a memory controller, and a processing-in-memory (PIM) execution unit, wherein the memory controller maps a memory address range for handling by the PIM execution unit, wherein the PIM execution unit is configured to:

receive one or more memory access requests addressed to a memory address; and responsive to the memory address being within the memory address range, automatically initiate execution of a PIM operation to perform a reduce-scatter operation comprising operations to:

store first data loaded from the second near-memory compute node;

perform a reduction operation on second data and the first data to compute a result; and store the result within the first near-memory compute node.

2. The system of claim 1, wherein the one or more memory access requests are received from the processor of the first near-memory compute node.

3. The system of claim 2, wherein the processor is configured to send the one or more access requests to the second near-memory compute node.

4. The system of claim 1, wherein each of the one or more memory access requests addressed to the memory address bypasses a cache hierarchy of a host processor that issues the memory access request.

5. The system of claim 1, wherein the automatically initiating of the PIM operation to perform the reduce-scatter operation is responsive to one or more of the memory access requests including an indication of a memory request type.

6. The system of claim 1, wherein the one or more access requests are received from a second processor associated with the second near-memory compute node.

7. The system of claim 1, wherein performing the reduction operation on the second data and the first data includes performing an add, multiply, MIN, MAX, AND, OR, or XOR operation on the first data and the second data to compute the result.

8. The system of claim 1, wherein storing the result within the first near-memory compute node includes executing a PIM store command within the first near-memory compute node.

9. The system of claim 1, wherein the first and second near-memory compute nodes are coupled to a plurality of other near-memory compute nodes in at least one of a ring topology or a tree topology.

10. The system of claim 1, wherein the reduction operation forms part of an all-reduce operation.

11. The system of claim 1, wherein the memory comprises a plurality of memory banks, wherein each memory bank of the plurality of memory banks includes a corresponding PIM execution unit configured to perform reduction operations independently of other memory banks.

12. An apparatus for performing distributed reduction operations using near-memory computation, the apparatus comprising:

memory;

a memory controller; and a first processing-in-memory (PIM) execution unit, wherein the memory controller maps a memory address range for handling by the PIM execution unit, wherein the PIM execution unit is configured to:

receive a memory access request addressed to a memory address; and responsive to the memory address being within the memory address range, automatically initiate execution of a PIM operation to perform a reduce-scatter operation comprising operations to:

store first data loaded from a second PIM execution unit;

perform a reduction operation on second data and the first data to compute a first result; and store the first result within the memory of the first PIM execution unit.

13. The apparatus of claim 12, wherein the memory access request is addressed to a memory address, and the execution is triggered in response to the memory address being within a memory address range.

14. The apparatus of claim 12, wherein the execution is triggered in response to the memory access request including an indication of a memory request type.

15. The apparatus of claim 12, wherein the first data is used as a first operand and the second data is used as a second operand of the reduction operation.

16. The apparatus of claim 15, wherein the PIM execution unit is coupled to a plurality of PIM execution units in at least one of a ring topology or a tree topology.

17. A method for performing distributed reduction operations using near-memory computation, the method comprising:

receiving, by a processing-in-memory (PIM) execution unit of a first near-memory compute node of a plurality of near-memory compute nodes, one or more memory access requests addressed to a memory address, wherein a memory controller of the first near-memory compute node maps a memory address range for handling by the PIM execution; and responsive to the memory address being within the memory address range, automatically initiating execution of a PIM operation to perform a reduce-scatter operation comprising operations including:

storing, by the PIM execution unit of the first near-memory compute node, first data within the first near-memory compute node, the first data being loaded from a second near-memory compute node;

performing, by the PIM execution unit of the first near-memory compute node, a reduction operation on second data and the first data to compute a result; and storing, by the PIM execution unit of the first near-memory compute node, the result within the first near-memory compute node.

18. The method of claim 17, wherein performing the reduction operation on the second data and the first data includes adding, multiplying, minimizing, maximizing, ANDing, or ORing the first data and the second data to compute the first result.

19. The method of claim 17, wherein the reduction operation forms part of an all-reduce operation.

* * * * *